UNITED STATES PATENT OFFICE.

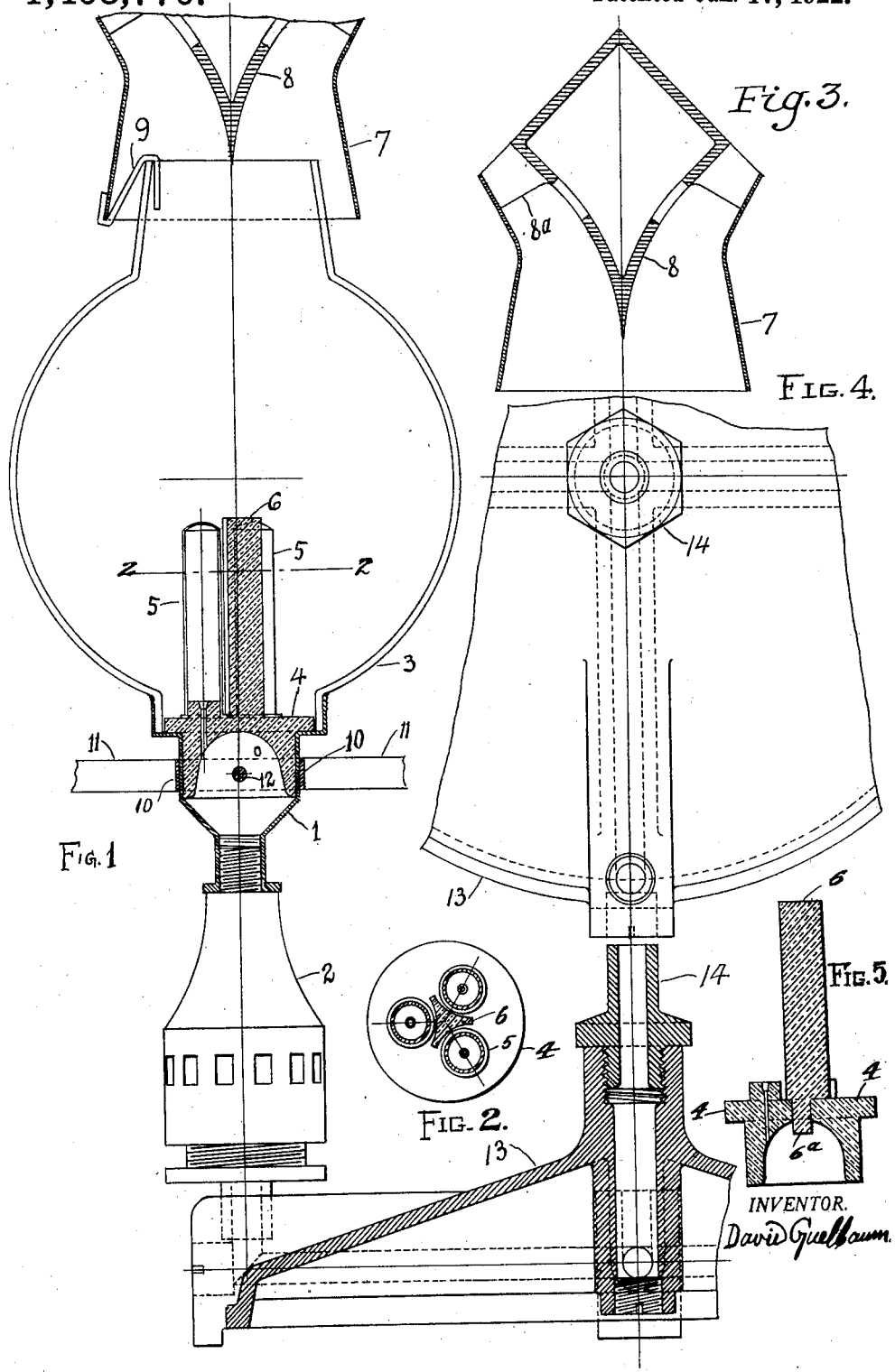

DAVID GUELBAUM, OF SYRACUSE, NEW YORK.

CLOSED HIGH-TEMPERATURE LIGHTING BURNER.

1,403,770.  Specification of Letters Patent.  Patented Jan. 17, 1922.

Application filed January 24, 1921. Serial No. 439,453.

*To all whom it may concern:*

Be it known that I, DAVID GUELBAUM, a citizen of the United States, and a resident of Syracuse, in the county of Onondaga, and State of New York, have invented a Closed High-Temperature Lighting Burner, of which the following is a specification.

This invention of a closed high temperature lighting burner has for its object higher efficiency in the use of gas for lighting, as regards:

1st—the quantity of gas consumed;
2d—the quality of light obtained, and
3d—the durability and strength of the incandescent materials used.

My invention embraces a new method of utilizing gas for lighting purposes, and mechanical devices for realizing that method in practice.

The new method consists in supplying to the lighting burner not mere gas, but a ready combustible mixture of gas and air so proportioned, as to gave a colorless flame of maximum temperature and with no surplus air in it.

To utilize the whole potential heat of such a ready combustible mixture at its highest temperature, the burner is closed, i. e. said combustible mixture is surrounded by a closed housing, consisting of an air tight fixture or ferrule with a glass chimney or globe on top, forming combinedly a housing filled with combustion gases having an exit or exhaust at the top, but closed side ways and at the bottom, so that no air can circulate through said housing, and the surrounding air is prevented from access to the combustible mixture and from contact with the flame, said housing being all filled with the combustion gases.

The interior of the burner housing is thus filled up with the hot products of combustion only, with no free oxidizing air in it. Consequently, in place of the frail and undurable incandescent materials, now in use, various kinds of plain metal fabric, or wire gauze, may be used as mantles, which will be safe to handle and will last indefinitely, as metal fabric, heated to any temperature of incandescence, below its melting point, in a non-oxidizing atmosphere, does not deteriorate.

My invention consists in the above set forth novel features, embodied in the combinations and constructions hereinafter set forth and described.

In describing this invention, reference is had to the accompanying drawings in which like characters designate the same parts in all the views.

Fig. 1 shows a sectional elevation of my closed burner in its ensemble.

Fig. 2 shows a cross section of the upper portion of the burner.

Fig. 3 is a section of the ventilator cap in its ensemble.

Fig. 4 is a partial top view of the pedestal.

Fig. 5 is a detail of tile seat and reflector connection.

For the exact mixing and proportioning of the gas and air at the source of the main supply, the mixing and proportioning valve for streams of large diameter may be used, described in my patent application of Dec. 21, 1920, Ser. No. 432,186, or any other means may be applied for that same purpose.

In cases where only common lighting gas is available, then the exact gas and air mixing and proportioning may be done at the lighting burner by means of the mixing and proportioning valve for small streams, (shown in section on Fig. 1) described in my patent application of Sept. 25, 1920, Ser. No. 412,736, or any other means may be applied for that same purpose.

My lighting burner designed for such a ready combustible mixture consists of the air tight fixture or ferrule 1, Fig. 1, having no perforations or other openings for air access. At its bottom the ferrule 1 terminates into the tapped nozzle 15 for connection to a standard gas burner tip, in cases where the gas and air mixing and proportioning is done at the source of supply; or for connection to the mixing and proportioning valve 2, Fig. 1, of the above said patent application No. 412,736, wherein the mixing and proportioning is done at the entrance to the burner.

As shown on Fig. 1 the gas enters the inner pipe 16 of the mixing and proportioning valve 2. The end of the inner pipe 16 is closed up by the cone shaped piece 17 and is provided with the side slots 18, through which the gas passes into the circumferential slot 19, between the cone piece 17 and the sleeve 20, and into the passage 21.

The air enters through the openings 22 in the casing 2 and passes into the same common passage 21, striking the gas sheet stream and intermingling with the same. By screwing the sleeve 20 in or out of the casing 2 the gas and air passages are closed or opened as much as desired, in a fixed ratio to each other, such as to produce the maximum temperature of the combustion gases to be generated.

From the mixing and proportioning valve 2 the combustion mixture passes into the interior of the fixture or ferrule 1, which is provided at its top with the faucet 23, holding the glass or porcelain globe or shade 3, or a regular glass cylinder or chimney, to form a closed housing around the burner.

Inside the ferrule 1 there is a fire proof tile seat 4, shown in section on Fig. 1 and in plan on Fig. 2, provided with several small openings for gas jets to pass through and with the small projecting hubs 24 around these openings for holding the small incandescent mantles 5, preferably made of metal fabric.

At its centre the tile seat 4 is provided with the reflector-piece 6, made of white fire proof material, for the purpose of preventing interference of the light rays, and also for increasing radiation.

This reflector-piece 6 may be made in one piece with the tile seat 4, as shown on Fig. 1, or it may be made separate and the tile seat provided with a hole in the centre for holding it as shown on Fig. 5.

As the temperature of the combustion gases is in this burner higher than usual, it is proper to mix the hot gases with air before their exit from the closed housing 3 and to disperse them over a wide area. For that purpose the globe or chimney is provided at its top with the ventilator-cap, shown on Figs. 1 and 3, and consisting of the double cone shaped casing 7, made preferably of light sheet metal, with the heavier cone piece 8 on top, supported on the casing 7 by the ribs 8ª, for resisting the lifting pressure of the upward current of the gases.

The casing 7 is supported on top of the globe or chimney 3 by the several wire hooks 9 (only one is shown). The cone piece 8 is shown on Fig. 3 as cast hollow in one piece, with the openings 25 for holding the core in the mould. But it may as well be made of light sheet metal and filled with some ballast.

The action of the ventilator cap is as follows: the surrounding air is entrained by the gas current through the bottom entrance into the casing 7, both—the gas and the air—intermingling within the casing 7 and dispersing along the divergent lower cone surface of piece 8 at the exit from the casing 7.

On the outside the ferrule 1 is provided with the ring 10 having projecting radial arms 11 for supporting a regular large shade or reflector of any design (not shown). The ring 10 is fastened to the ferrule 1 reliably by means of the pin or bolt 12 passing through the ferrule and the ring.

One or more such closed lighting burners, with mixing and proportioning valves attached, may be fastened to the pedestal 13, as shown on Fig. 1. The gas is supplied at the centre of the pedestal preferably by means of a flexible pipe, attached to the connecting piece 14. From the central pipe or hub 26 of the pedestal, plugged up at the bottom, the radiating channels 27 lead the gas to the entrances into the mixing and proportioning valve 2.

Any one of the channels 27 not so used is plugged up, as shown on Fig. 1 at 28.

The closed burner with the mixing and proportioning valve attached may also be screwed on direct to existing regular burner tips.

What I claim is:

1. A burner comprising a fitting threaded at one end for connection to a gas and air mixing and proportioning mechanism, the other end of said fitting being widened out, flanged and rimmed, a tile fixture supported on the flanged end of said fitting and provided with apertures for the gas and air mixture jets and with gas mantles over said jets, a reflector in the centre of said tile fixture, a ring with radial arms supporting a shade fastened to said fitting, a closed housing surrounding said gas mantles formed by a globe held tight on the rimmed flange of said fitting and having a contracted exhaust opening on top carrying a ventilator cap, substantially as and for the purposes specified.

2. A burner comprising a fitting threaded at one end for connection to a gas and air mixing and proportioning mechanism and widened out and provided with a flange and rim at its other end and with a bolt passing through it for holding on its outside a ring with radial arms, a tile fixture supported on the flanged end of said fitting, gas mantles on top of said tile fixture, a closed housing surrounding said gas mantles and supported on the rimmed flange of said fitting, a ventilator cap on top of said housing, substantially as and for the purpose described.

3. A burner comprising a fitting threaded at one end, flanged and rimmed at the other end, and a tile fixture supported on the flange of said fitting with a concave shaped bottom having apertures for gas and air mixture jets and with projecting hubs on top for holding gas mantles over said jets and provided with a reflector piece in center, a closed housing surrounding said gas mantles and supported on said fitting, substantially as and for the purpose set forth.

4. A burner comprising a fitting threaded at one end and flanged and rimmed at the other end, a tile fixture with gas mantles supported on said fitting, and a closed housing surrounding said gas mantles and formed by a globe with its bottom closed and held tight by the flange and rim of said fitting and having a contracted exhaust opening on top supporting a ventilator cap comprising a light metal casing with a center piece and suspending hooks, substantially as and for the purpose specified.

In testimony whereof, I have herein signed my name, at Syracuse, in the county of Onondaga, and State of New York, this 22nd day of Jan., 1921.

DAVID GUELBAUM.